United States Patent [19]

Mintz et al.

[11] Patent Number: 5,539,872
[45] Date of Patent: Jul. 23, 1996

[54] AUTOMATED SELECTION OF A SCREEN DISPLAY TO BE PRESENTED IN A COMPUTER SYSTEM IN RESPONSE TO A USER INQUIRY

[75] Inventors: Donald J. Mintz, Fair Haven, N.J.; Robert F. Schillo, Granville, Ohio

[73] Assignee: AT&T Corp., Murray Hill, N.J.

[21] Appl. No.: 160,013

[22] Filed: Nov. 30, 1993

[51] Int. Cl.⁶ ................................................ G06F 3/14
[52] U.S. Cl. ................................. 395/155; 395/161
[58] Field of Search ......................... 395/155, 161, 395/156, 157, 158, 159, 160, 600; 364/188

[56] References Cited

U.S. PATENT DOCUMENTS 5,136,690  8/1992  Becker et al. ........................ 395/161
5,226,118  7/1993  Baker et al. .......................... 395/161
5,321,803  6/1994  Ditter, Jr. ............................. 395/161
5,367,675  11/1994  Cheng et al. ......................... 395/600

Primary Examiner—Raymond J. Bayerl
Assistant Examiner—Crescelle N. dela Torre
Attorney, Agent, or Firm—Charles L. Warren

[57] ABSTRACT

Upon identification of an information category by the user, a set of windows is automatically identified based on predetermined associations with the user's input as stored in the database. Based on the selected set of window definitions, requests are transmitted to equipment associated with the computer system to obtain data related to the window definitions. The computer system receives the responses from the equipment and applies a stored set of rules to rank the importance of each window definition of the selected set. The window having the highest importance is displayed to the user.

18 Claims, 5 Drawing Sheets

| 54 | 56 | 58 | ,52 |
|---|---|---|---|
| OBJECT | SUBJECT | DISPLAY | |
| ⋮ | | | |
| ROUTE | UNAVAIL | FLAGS | |
| ROUTE | UNAVAIL | BACKUP NETWORK PERFORMANCE | |
| ROUTE | UNAVAIL | BACKUP NETWORK CONTROL | |
| ⋮ | | | |

*FIG. 3*

| | DISPLAY (62) | PARAM1 (64) | PARAM2 (66) | PARAM3 (68) | PARAM4 (70) | ADD'L PARAMS (72) |
|---|---|---|---|---|---|---|
| | ⋮ | | | | | |
| 74 | FLAGS | SWITCH | OVERLOAD FLAG | BACKUP NETWORK FLAG | PARAM | PARAMS |
| 76 | BACKUP NETWORK PERFORMANCE | SWITCH | BACKUP NETWORK ROLE | GATEWAY MESSAGES | REGION | PARAMS |
| 78 | BACKUP NETWORK CONTROL | SWITCH | CONTROL TYPE | CONTROL VALUE | PARAMS | PARAMS |
| | ⋮ | | | | | |

*FIG. 4*

| DISPLAY 82 | PARAM1 84 | PARAM2 86 | PARAM3 88 | PARAM4 90 |
|---|---|---|---|---|
| | ⋮ | | | |
| 92 FLAGS | SWITCH | OVERLOAD FLAG | BACKUP NETWORK FLAG | |
| | 10 | OFF | ON | ~98 |
| | 11 | OFF | ON | ~100 |
| | 12 | ON | ON | ~102 |
| | 1-5 | OFF | OFF | ~104 |
| | 6-9 | ON | OFF | ~106 |
| 94 BACKUP NETWORK PERFOR- MANCE | SWITCH | BACKUP NETWORK ROLE | GATEWAY MESSAGES | REGION |
| | 10 | BACKUP NETWORK OUTBOUND MESSAGE HELPER | NONE | EAST |
| | 11 | BACKUP NETWORK OUTBOUND MESSAGE HELPER | NONE | EAST |
| | 12 | BACKUP NETWORK INBOUND MESSAGE HELPER | NONE | EAST |
| | 13 | BACKUP NETWORK INBOUND MESSAGE HELPER | NONE | EAST |
| | 14 | GATEWAY | 400 | EAST |
| | 1-9 | NONE | NONE | WEST |
| 96 BACKUP NETWORK CONTROL | SWITCH | CONTROL TYPE | CONTROL VALUE | |
| | 12 | BACKUP NETWORK INBOUND HELPER | OFF | |
| | 13 | BACKUP NETWORK INBOUND HELPER | OFF | |
| | ⋮ | | | |

*FIG. 5*

AUTOMATED SELECTION OF A SCREEN DISPLAY TO BE PRESENTED IN A COMPUTER SYSTEM IN RESPONSE TO A USER INQUIRY

BACKGROUND OF THE INVENTION

This invention relates generally to the retrieval of information in a computer system utilizing a "windowing" type environment, and more specifically, addresses the problem encountered by users in having to navigate though a plurality of screens in order to reach the screen containing the desired information.

A computer system utilizing a graphical user interface can present the user with a plurality of choices, each having an associated window or screen display. Assuming that a hierarchy of windows exists which requires the user to traverse window-to-window in order to continue the selection process, the user is faced with making a number of choices in each window, each of which must be correct in order to arrive at the desired screen. Thus, it will be apparent that problems arise in being able to quickly and efficiently navigate through such a system in order to reach a desired screen.

This problem is especially noticeable in systems in which the user does not have sufficient information to determine a particular path through a windows environment to reach a desired screen. For example, in telecommunication networks the Network Management Operation System available from AT&T provides a system which allows the long distance telecommunication network to be monitored based on data obtained from telecommunication switches within the network. When a user of such a system receives a trouble or problem alert, it may be difficult to know which part of the system and what type of data should be reviewed in order to more specifically identify the underlying problem. Because a large number of data sources, i.e. switches are providing data and because of the complexity of such a network, it is often difficult for such a user to efficiently navigate through the windows to arrive at the desired screen which will provide data that will enable the user to identify the underlying problem. Thus, there exists a need to provide automated assistance in helping the user to more quickly reach the screens and data needed to address a given problem.

SUMMARY OF THE INVENTION

It is an object of the present invention to provide navigation help to users of computer systems to assist them in arriving at desired screens by utilizing automated data acquisition and rule based decision making.

In accordance with an embodiment of the present invention, a method is implemented by a computer system for selecting information to be displayed in order to assist the user. The user provides an input to the computer system which identifies information sought by the user. Based on this input, a set of screen types is automatically identified based upon predetermined associations with the user's input as stored in a database in the computer system. Based upon the selected set of screen types, requests are transmitted to equipment associated with the computer system for values associated with data parameters associated with the set of screen types. The computer system receives the responses from the equipment including the requested values. Rules stored in the computer system are applied to rank the importance of each screen type of the selected set. The data values received from the equipment is utilized as a factor in determining the rankings. The screen having the highest importance is displayed to the user. Thus, the navigation in a windowing environment is simplified by automatically making decisions based on the automatically obtained data related to the application of predetermined rules to respond to the user's input.

BRIEF DESCRIPTION OF THE DRAWING'S

FIG 1. is a block diagram illustrating a telecommunications network which incorporates an embodiment of the subject invention.

FIG 2. illustrates an exemplary window in accordance with the present invention illustrating user input.

FIG 3. illustrates a table which is representative of tuples that correlate user inputs predefined set of windows.

FIG 4. illustrates a table which represents tuples that define parameters of the different windows which make up a predetermined set of windows.

FIG 5. illustrates a table which represents in greater detail data associated the parameters of each of the windows in the selected set.

FIG 6. illustrates an exemplary window which is preselected for display to a user based on the limited input from the user in accordance with the present invention.

DETAILED DESCRIPTION

Figure 1:
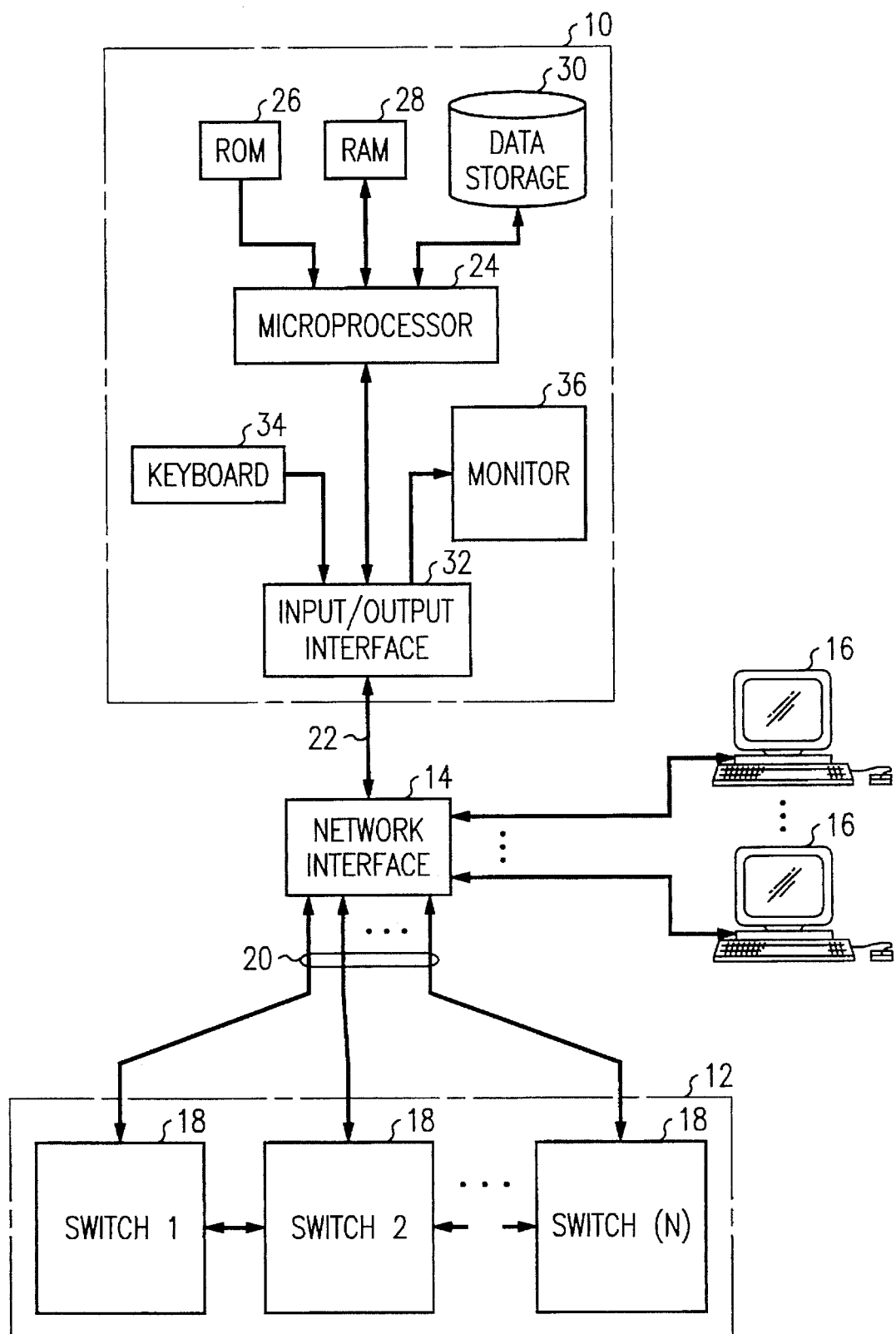

FIG. 1 illustrates a telecommunication network which includes a computer system 10 that operates in accordance with the present invention to monitor the status and traffic characteristics of the telecommunication system 12. As used herein, reference to a "user(s)" refers to personnel responsible for monitoring, trouble shooting, and controlling a system such as telecommunication system 12. A network interface 14 couples terminals or personal computers 16 to computer system 10 and telecommunication system 12.

The telecommunication system 12 includes a plurality of telecommunication switches 18 such as AT&T 4ESS™ switches may comprise a long distance telephone network. The network interface 14, which may comprise an AT&T Network Management Operation System, is coupled by communication channels 20 to the switches 18. The network interface 14 provides a means for communicating with each switch and facilitates the transmission of data to and the reception of information from each switch. A communication channel 22 provides a communication path between network interface 14 and computer system 10. As will be known to those skilled in the art, each switch 18 monitors operational parameters of the switch and parameters associated with the routing and flow of traffic relative to the switch. This data is stored in each switch and can be accessed by a request via network interface 14.

Computer system 10 includes a microprocessor 24 which is supported by read-only memory (ROM) 26, random access memory (RAM) 28, and a data storage device 30 such as a hard disk drive. An input/output interface 32 assists microprocessor 24 in communicating with keyboard 34, display monitor 36, and the communication channel 22 which accommodates inbound and outbound communications relative to computer system 10.

In computer system 10, microprocessor 24 operates under program instructions stored in ROM 26 and RAM 28. Data storage device 30 supports a database in the illustrative embodiment to store and analyze data associated with switches 18. Information can be displayed to users via monitor 36 or can be transmitted through input/output interface 32 for display on the monitors associated with computers 16.

Figure 2:
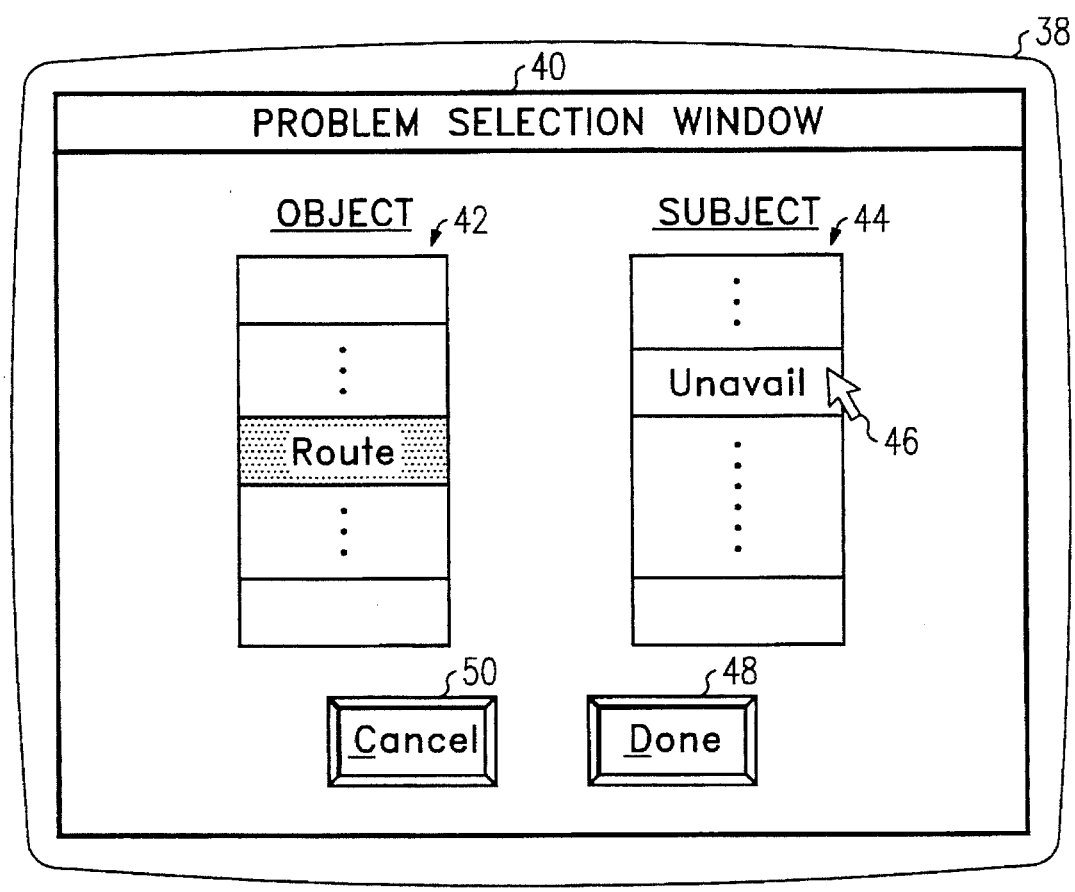

FIG. 2 illustrates a face 38 of a display monitor which is displaying a "PROBLEM SELECTION WINDOW" screen 40 in accordance with an embodiment of the present invention. In the exemplary embodiment, separate object and subject columns 42 and 44, respectively, each contain indicia, such as names, which can be selected by a user utilizing a pointing device such as a mouse. In FIG. 2, a user has already selected the name "Route" in object column 42 and is preparing to select "unavail" (unavailable) in the subject column 44 as indicated by the pointing arrow 46. Although only two illustrative names are shown on screen 40, it will be appreciated by those skilled in the art that a plurality of selectable names or indicia are stored respectfully for columns 42 and 44 in a database contained in data storage device 30. Names can be scrolled in each column.

In the preferred embodiment, the user first selects indicia in column 42 which is utilized to define available indicia which will then made available to the user for selection in column 44. That is, different sets of subject indicia are stored for each object indicia. This simplifies the process of selecting indicia in column 44. In the illustrative example, the user is attempting to obtain information relating to an alarm condition indicating a problem with a route between two of the switches 18. Thus, a logical choice for the user in column 42 is to select "Route" and the unavailable indicia in column 44 in hopes of discovering information relating to route unavailability. After the user has finished making the selections, the user selects the "Done" button 48 illustrated in screen 40. This initiates action by the computer system 10 to process the input received from the user. Alternatively, the user can stop the entry process by selecting the "Cancel" button 50.

FIG. 3 illustrates a table 52 representative of data stored in a database associated with data storage device 30. The object column 54 and subject column 56 correspond to the selections made by the user in columns 42 and 44 of FIG. 2. A display column 58 identifies displays, i.e. windows or screens, which have been assigned to the selected combination of object and subject items. In the illustrative example, the combined selection of "Route unavail" has three possible screens which can be utilized to provide information concerning these selected items. In accordance with the present invention, the database stores the predetermined selection of possible screens which could contain relevant information relative to the possible combinations of object and subject choices.

FIG. 4 illustrates a table 60 representative of additional data stored in the database in data storage device 30. For each display 58 identified in table 52, a corresponding display exists in column 62 in table 60. Additional parameters are specified in table 60 for each of the possible displays. These parameters will vary depending upon the nature of the display. In accordance with the exemplary table 60, columns 64, 66, 68, 70, and 72 illustrate parameters associated with the telecommunications system 12 for the respective displays. Each row 74, 76, and 78 in the illustrated portion of table 60 comprises a tuple in which related parameters are associated with a display as identified in column 62.

FIG. 5 illustrates a table 80 representative of data stored in the database in data storage device 30 and has columns 82, 84, 86, 88, and 90 which correspond generally to columns 62, 64, 66, 68, and 70 in table 60. Likewise, rows 92, 94, and 96 correspond with rows 74, 76, and 78 of table 60. It will be noted, however, that a plurality of tuples exist for each display in table 80. For example, tuples 98, 100, 102, 104, and 106 each correspond to flag related data associated with switches or switch groups identified in each tuple. For row 92, column 86 corresponds to an overload flag and column 88 contains parameters relating to a back-up network flag for each of the respective switches. In the illustrative embodiment, no additional information is contained in column 90 with regard to row 92. It will be apparent upon observing table 80 that each of the rows contains specific parameter specified data types which may consist of a name, a binary parameter, or a data parameter which may consist of a value representative of a corresponding characteristic of a switch.

Figure 6:
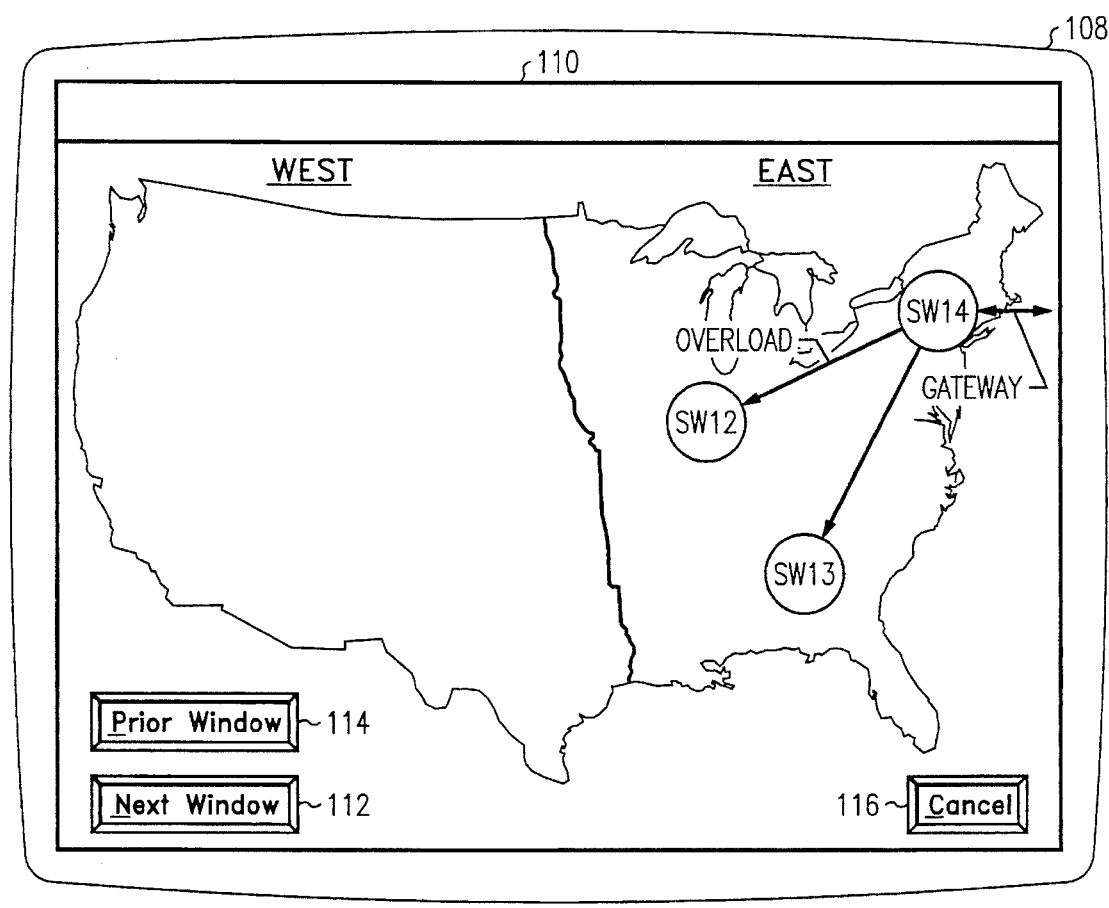

FIG. 6 illustrates a face 108 of a display which in the illustrative embodiment is displaying a screen 110 of the outline of the continental United States. In accordance with the graphic illustration, the United States is shown divided into West and East sections with certain switches identified in their approximate geographic locations in the East section. For example, switch 13 may be located in Atlanta, Ga.; switch 14 may be located near New York City, N.Y.; switch 12 may be located in Chicago, Ill. It will be noted that the communication link between switch 14 and 12 has been labeled with the word "OVERLOAD". FIG. 6 illustrates a screen which is presented, in accordance with the embodiment of the present invention, to the user after the user completes entry of the information associated with the screen shown in FIG. 2. This provides automatic navigation to a screen that may provide the needed information about the problem being sought by the user. The method associated with the selection of screen 110 is explained below.

It will be apparent to those skilled in the art that certain information must be entered into the database stored in computer system 10 before a user's request can be processed by the embodiment of the invention. A predefined set of display types 58 as shown in FIG. 3 must be determined for each selectable object and subject combination. The sets of display types are based on foreseen relationships among the selected object/subject pairs and information that would typically be relevant to such a request. Parameters 64–72 which identify specific types of data must be defined for each display type 62. Data storage fields corresponding to items in the tuples 98–106 are needed to store the data received from external equipment, i.e. the switches 18, in reply to requests sent by computer system 10.

The following table of actions in accord with the embodiment of the present invention will facilitate a better understanding of the invention by way of a specific example of steps taken in response to input from a user seeking the selection of a display with relevant information.

TABLE OF ACTIONS (A) A list of selectable objects and subjects is presented to the user in columns 42 and 44 in the Problem Selection Window 40.

(B) The user selects an object and subject, and then indicates completion by activating the "Done" button. In the illustrated example, the object "Route" and the subject "Unavail" is selected.

(C) The set of display types 58 to be considered is identified based on the matching object/subject pairs in the database as represented by table 52 (see FIG. 3) with the object/subject pair input by the user. In the illustrated example, three matching display types exist.

(D) For each display types 62 in the set, identify the associated parameters 64–72 by locating the tuples 74–78 corresponding to the display types in table 60. FIG. 4 shows this general relationship.

(E) The set of more specific tuples 98–106 associated with display 92, and corresponding tuples for display types 94, 96, specify the particular data to be utilized in making a decision of which window to exhibit; see table 80 in FIG. 5. This information is stored in the database in computer system 10 for each display type.

(F) The information associated with table 80 is utilized to define those parameters for which values are needed. For example, in tuple 98 data associated with switch 10 is needed including whether the overload flag is ON or OFF, and whether the backup network flag is ON or OFF. Corresponding data associated with each tuple in table 80 is preferable used in making the decision of which window to exhibit.

(G) Based on the data as defined by table 80, requests for the needed data are automatically transmitted from computer system 10 via network interface 14 to the respective sources of the needed data, i.e. to the respective switches. As evidenced by tuples 104 and 106 certain of the data may be consolidated where individual switch data is repetitive or group data is sufficient.

(H) The computer system 10 receives responses to the data requests from the switches and places the data into the proper field in the database, e.g. "OFF" for switch 11 overload flag 86 and "ON" for switch 12 overload flag 12. The responses depend on the nature of the request; the responses may be a binary reply representing ON/OFF or YES/NO, or may be a numerical reply representing a value of a requested parameter.

(I) The computer system 10 stores a predetermined set of rules which are applied to the information in table 80 including the received data from the switches to rank the relative importance of displays 92, 94 and 96. These rules can include logical conditions and tests as well a numerical analysis of appropriate data either relative to other corresponding data or to stored boundary limits.

(J) The screen 110 exhibited to the user is associated with the most important (highest) ranked display of displays 92, 94 and 96. The definition of the screen, i.e. the elements or data to be seen on the monitor, can be predetermined based on the associated display type or can be determined in accordance with rules which vary depending of the type or magnitude of data associated with the display type. In the illustrative example, an outline of the continental United States is shown on screen 110 based on the selection of display 94. The 400 gateway messages in column 88 is recognized as being abnormal and hence the East half of the United States is emphasized with the switch 14 associated with the abnormal condition and its linked switches 12 and 13 shown on screen 110. An "OVERLOAD" flag identifies the traffic path from switch 14 to switch 12 based on an "ON" overload flag in column 86 for switch 12.

(K) The user then can choose to go to the next most display by the "Next Window" button 112 or terminate action based on the user's input by the "Cancel" button 116. The "Prior Window" button 114 is available as a choice if the current screen is not the top screen, i.e. no prior screens exist. As further screens are requested by the "Next Window" button, the process returns to step (J) since the rankings have already been determined for all the set of displays associated with the user's input request.

In view of the above description, it will be apparent to those skilled in the art that the embodiment of the present invention provides a solution to users by allowing desired screen displays to be more quickly reached. It will also be apparent that variations of the exemplary embodiment can be made. For example, an intermediate screen which provides the user with an opportunity to select the desired screen to be displayed from among a displayed button listing of the ranked displays, i.e. displays 92, 94, and 96 in the illustrative example.

Although an embodiment of the present invention has been described and illustrated in the drawings, the scope of the invention is defined by the claims which follow.

We claim:

1. A method implemented by a computer system for selecting information to be displayed by the computer system comprising the steps of:

accepting input from a user, said input defining one subject which the user seeks information from among a plurality of selectable subjects;

automatically identifying one set of screen definitions from among a plurality of predetermined sets of screen definitions, said one set of screen definitions corresponding to said one subject input by the user;

determining data parameters associated with said one set of screen definitions;

automatically acquiring values associated with said data parameters;

automatically applying selection rules stored in the computer system to rank the importance of each screen definition in said one set of screen definitions, the values received for the corresponding data parameters being included as a factor in said rankings;

automatically displaying one screen associated with said one set of screen definitions based on said rankings.

2. The method according to claim 1 wherein said transmitting step comprises the step of automatically transmitting requests to equipment in a telecommunication system coupled to said computer system, said data parameters representing characteristics of the telecommunication system and said values comprising measurements of said characteristics.

3. The method according to claim 1 wherein said step of determining data parameters comprises the step of locating a tuple in a database associated with each screen definition in said one set of screen definitions, the tuples identifying said data parameters.

4. The method according to claim 3 wherein said step of applying selection rules comprises the step of comparing a value associated with said tuple in the database to at least one predetermined limit value stored in said database, said ranking based on said comparison of said value and said limit value.

5. The method according to claim 1 wherein said displaying step comprises the step of automatically displaying said one screen having the highest rank.

6. The method according to claim 1 wherein said applying step and displaying step are each performed without manual action by the user.

7. A method implemented by a computer system for selecting information to be displayed by the computer system comprising the steps of:

accepting input from a user, said input defining one subject which the user seeks information from among a plurality of selectable subjects;

automatically identifying one set of screen definitions from among a plurality of predetermined sets of screen definitions, said one set of screen definitions corresponding to said one subject input by the user;

automatically acquiring values of data parameters associated with said one set of screen definitions;

automatically applying selection rules stored in the computer system to rank the importance of each screen definition in said one set of screen definitions, the values received for the corresponding data parameters being included as a factor in said rankings;

automatically displaying a list of indicia prioritized based on said rankings, each indicia corresponding to a screen definition of said one set of screen definitions.

8. The method according to claim 7 further comprising the steps of receiving a user selection of one of said indicia and displaying the screen associated with said indicia.

9. The method according to claim 7 further comprising the step of automatically displaying the screen associated with said indicia having the highest prioritization absent the user selecting a different indicia.

10. The method according to claim 7 wherein said transmitting step comprises the step of automatically transmitting requests to equipment in a telecommunication system coupled to said computer system, said data parameters representing characteristics of the telecommunication system and said values comprising measurements of said characteristics.

11. The method according to claim 7 further comprising the step of locating a tuple in a database associated with each screen definition in said one set of screen definitions, the tuples identifying said data parameters.

12. The method according to claim 11 wherein said step of applying selection rules comprises the step of comparing a value associated with said tuple in the database to at least one predetermined limit value stored in said database, said ranking based on said comparison of said value and said limit value.

13. The method according to claim 7 wherein said applying step and displaying step are each performed without manual action by the user.

14. In a telecommunication network having a plurality of equipment wherein at least some of said equipment maintains data relating to the operation of the network, a method implemented by a computer system coupled to said network for selecting information to be displayed about the network comprising the steps of:

accepting input from a user, said input defining one subject which the user seeks information from among a plurality of selectable subjects;

automatically identifying one set of screen definitions from among a plurality of predetermined sets of screen definitions, said one set of screen definitions corresponding to said one subject input by the user;

determining which, if any, of said data is associated with said one set of screen definitions;

automatically acquiring values associated with said data determined to be associated with said one set of screen definitions;

automatically applying selection rules stored in the computer system to rank the importance of each screen definition in said one set of screen definitions, the values received for the corresponding data parameters being included as a factor in said rankings;

automatically displaying one screen associated with said one set of screen definitions based on said rankings.

15. The method according to claim 14 wherein said step of determining comprises the step of locating a tuple in a database associated with each screen definition in said one set of screen definitions, the tuples identifying said data parameters.

16. The method according to claim 15 wherein said step of applying selection rules comprises the step of comparing a value associated with said tuple in the database to at least one predetermined limit value stored in said database, said ranking based on said comparison of said value and said limit value.

17. The method according to claim 12 wherein said displaying step comprises the step of automatically displaying said one screen having the highest rank.

18. The method according to claim 14 wherein said applying step and displaying step are each performed without manual action by the user.

* * * * *